United States Patent
Hibi et al.

(10) Patent No.: US 6,258,303 B1
(45) Date of Patent: Jul. 10, 2001

(54) APPARATUS AND METHOD OF MONITORING INJECTION MOLDING OPERATION WHEREIN SPRUE GATE CLOSING POINT OF TIME IS INDICATED TOGETHER WITH DISPLAYED PARAMETER WAVEFORMS

(75) Inventors: Kouzou Hibi; Mitsunori Seki, both of Nagoya (JP)

(73) Assignee: Kabushiki Kaisha Meiki Seisakusho, Ohbu (JP)

(*) Notice: Subject to any disclaimer, the term of this patent is extended or adjusted under 35 U.S.C. 154(b) by 0 days.

(21) Appl. No.: 09/323,756

(22) Filed: Jun. 1, 1999

(30) Foreign Application Priority Data

Jun. 30, 1998 (JP) .................................... 10-184011

(51) Int. Cl.[7] .................................................. B29C 45/77
(52) U.S. Cl. ...................... 264/40.5; 264/40.7; 425/145; 425/149; 425/150
(58) Field of Search .................................. 425/145, 150, 425/149, 589, 590, 595, 156, 166, 167; 264/40.5, 40.7

(56) References Cited

U.S. PATENT DOCUMENTS

| | | | |
|---|---|---|---|
| 4,274,823 | * 6/1981 | Stanciu et al. ........................ | 425/145 |
| 5,030,395 | * 7/1991 | Kamiguchi et al. .................. | 264/40.5 |
| 5,539,650 | * 7/1996 | Hehl ................................ | 364/476.05 |
| 5,611,975 | * 3/1997 | Kamiguchi et al. .................. | 264/40.1 |
| 5,800,748 | * 9/1998 | Kamiguchi et al. .................. | 264/40.1 |
| 5,916,501 | * 6/1999 | Hehl .................................... | 264/40.1 |
| 5,945,046 | * 8/1999 | Hehl et al. .......................... | 264/40.1 |

FOREIGN PATENT DOCUMENTS 7-205245   8/1995  (JP) .

* cited by examiner

Primary Examiner—Tim Heitbrink
Assistant Examiner—Emmanuel Luk
(74) Attorney, Agent, or Firm—Burr & Brown

(57) ABSTRACT

Apparatus and method of monitoring an injection molding machine for molding a disc substrate, wherein a display device is controlled based on sensor outputs to display waveforms of operating parameters of the machine, including at least four parameters selected from among a speed and a pressure of injection of a material into a mold cavity, a mold clamping pressure, a backward movement amount of a movable mold half and a position of an injecting screw of the machine, such that each waveform represents a chronological change of a value of the corresponding parameter, and the display device is further controlled to indicate a point of time at which a sprue gate through which the material is injected into the mold cavity is closed, such that the point of time is indicated together with the displayed waveforms of the operating parameters displayed. Also disclosed is a computer-accessible recording medium storing a control program to be executed to practice the method.

13 Claims, 3 Drawing Sheets

| OPERATING PARAMETERS | INITIAL VALUE | CHANGE % PER GRADUATION | DISPLAY RANGE |
|---|---|---|---|
| 1. INJECTION SPEED | +2 | 10% | −50.0∼+200.0 (mm/sec) |
| 2. INJECTION PRESSURE | +1 | 20% | −20.0∼+180.0 (MPa) |
| 3. MOLD CLAMPING PRESSURE | +5 | 20% | −100∼+100 (MPa) |
| 4. BACKWARD MOVEMENT OF MOVABLE MOLD HALF 24 | +1 | 0.05% | −0.05∼+0.45 (mm) |

APPARATUS AND METHOD OF MONITORING INJECTION MOLDING OPERATION WHEREIN SPRUE GATE CLOSING POINT OF TIME IS INDICATED TOGETHER WITH DISPLAYED PARAMETER WAVEFORMS

This application is based on Japanese Patent Application No. 10-184011 filed Jun. 30, 1998, the content of which is incorporated hereinto by reference.

BACKGROUND OF THE INVENTION

1. Field of the Invention

The present invention relates in general to techniques for monitoring and controlling an operation of an injection molding machine for producing a disc substrate, to improve the consistency in the quality of the produced disc substrate. More particularly, the present invention is concerned with an apparatus and a method of monitoring such an injection molding machine, which include a device for or step of displaying operation data of the machine, and a control apparatus for controlling the machine by using such a monitoring apparatus.

2. Discussion of the Related Art

Generally, a disc substrate used for molding an optical or magneto-optical disc is advantageously produced by injection molding using a resin material. Such a disc substrate is required to have a high degree of dimensional accuracy and excellent physical properties. To meet this requirement, an operation of an injection molding machine adapted to mold the disc substrate is required to be controlled with high accuracy and stability. To control the operation of the injection molding machine, it is considered to monitor its operating condition, by detecting an injection speed, an injection pressure, an operating position of an injection screw and other operating parameters, with suitable sensors or detectors. Operation data of the machine represented by the output signals of these sensors are stored in a memory, and are displayed on a suitable display device such as an oscilloscope.

JP-A-7-205245 (publication of an unexamined Japanese patent application) discloses a data analyzing apparatus including a microcomputer which is adapted to: process the output signals of various sensors provided on an injection molding machine; store operation data of the machine based on the output signals for each cycle of injection molding to produce a disc substrate; analyze the stored operation data; and display the stored operation data on a display device, together with numerical values obtained as a result of the analysis.

Such a known data analyzing apparatus is adapted to simply display the operation data, which are continuously varying during an injection molding operation of the machine. Therefore, the user or operator of the machine who observes the display device has difficulty to accurately estimate or recognize an influence of the present operating condition of the machine on the quality of the injection molded product. The machine operator is required to have long experience and intensive and extensive professional knowledge in order to monitor the operating condition of the machine based on the operation data provided on the display device. Thus, the known data analyzing apparatus does not assure a high degree of consistency in the quality of the product.

The above-identified publication also discloses a technique for displaying maximum and minimum values, rise and fall times and other numerical values of various operating parameters of the machine, which have been obtained by analyzing the stored operation data. However, those numerical values displayed are also operating parameter values which are continuously varying from time to time and which do not enable the machine operator or user to accurately monitor the operating condition of the machine.

Further, the known data analyzing or monitoring apparatus is arranged to store and analyze operation data obtained by the sensors and analyze the obtained operation data for each injection molding cycle or shot, and display a result of the analysis on the display device in the next injection molding cycle or cycles. Actually, however, this arrangement does not permit a prompt manipulation to adjust the operating condition of the machine based on the displayed data, during a series of injection molding cycles. Thus, the known apparatus suffers from a delayed feedback of the operation data to adequately control the injection molding operation.

SUMMARY OF THE INVENTION

It is a first object of the present invention to provide a monitoring apparatus which permits easy and accurate monitoring of an operating condition of an injection molding machine and the quality of a disc substrate molded by the machine.

A second object of this invention is to provide a control apparatus capable of controlling the injection molding machine with high accuracy, so as to maintain an optimum operating condition of the machine with high stability.

A third object of the invention is to provide a monitoring method which permits easy and accurate monitoring of the operating condition of the injection molding machine and the quality of the disc substrate molded by the machine.

A fourth object of the invention is to provide a recording medium which is accessible by a computer and which stores a control program to be executed by the computer to suitably practice the monitoring method indicated above.

The first object indicated above may be achieved according to a first aspect of this invention, which provides an apparatus for monitoring an operating condition of an injection molding machine adapted to mold a disc substrate by injection molding, the injection molding machine including a mold device having a stationary and a movable mold half which cooperate to define a mold cavity to be filled with a material to mold the disc substrate, and a sprue gate through which the material is injected into the mold cavity, the injection molding machine further including an injecting screw for injecting the material into the mold cavity through the sprue gate, the monitoring apparatus comprising a display device for displaying operation data relating to an operation of the machine, the monitoring apparatus further comprising: (a) first display control means operable on the basis of output signals of sensors provided on the injection molding machine, for controlling the display device to simultaneously or selectively display, as the operation data, waveforms of a plurality of operating parameters including at least four operating parameters selected from a group consisting of a speed of injection of the material into the mold cavity, a pressure of injection of the material into the mold cavity, a clamping pressure of the mold device, an amount of backward movement of the movable mold half, and a position of the injecting screw, the waveforms representing chronological changes of values of the above-indicated plurality of operating parameters, respectively; and (b) second display control means for controlling the display device to indicate a first point of time at which the sprue gate is closed, such that the first point of time is indicated together with the waveforms of the above-indicated plurality of operating parameters as displayed under the control of the first display control means.

In the monitoring apparatus constructed according to the first aspect of this invention, at least four operating parameters of the injection molding machine whose values vary with time are selected from among (1) the material injection speed, (2) the material injection pressure, (3) the mold clamping force, (4) the amount of backward movement of the movable mold half, and (5) the position of the injecting screw. These at least four operating parameters are detected on the basis of the output signals of the respective sensors. Based on these output signals, the first display control means is operated to control the display device to display at least the waveforms of the selected at least four operating parameters as respective continuous lines in a rectangular coordinate system wherein the values of the operating parameters are taken along one of two mutually perpendicular axes, while the time is taken along the other axis. The waveforms of all of the plurality of operating parameters may always be displayed simultaneously. Alternatively, the waveforms may be selectively displayed sequentially. For instance, the waveforms may be displayed sequentially at least one at a time. The waveforms may be displayed in respective different areas of the display screen, or may be displayed in the same area such that the waveforms are superposed on each other in the same coordinate system.

In the present monitoring apparatus, the second display control means is adapted to control the display device to indicate the above-indicated first point of time, that is, the point of time of the closing of the sprue gate of the mold device, such that the first point of time is indicated at an appropriate position along the axis of the coordinate system along which the time is taken. The sprue gate of the mold device through which the material is injected into the mold cavity is closed by an advancing movement of a male cutter sleeve into engagement with a female cutter sleeve in the mold device, for instance. The first point of time may be a point of time at which a signal for initiating the advancing movement of the male cutter sleeve is generated. The first point of time may be set in relation to a reference point of time at which a predetermined event of operation of the injection molding machine takes place, or in relation to a predetermined operating state of the injection molding machine. For instance, the first point of time may be set as a time length or lapse from a point of time at which the injection pressure of the material is reduced from an initial level to a hold level lower than the initial level. Alternatively, the first point of time may be a point of time at which the injecting screw has been moved to a predetermined axial position. The first point of time may be indicated by an appropriate symbol or character such as a line or a dot. Preferably, the first point of time is indicated by a straight line which is located at an appropriate position along the axis of the coordinate system along which the time is taken, and which straight line is parallel to the other axis of the coordinate system along which the values of the operating parameters are indicated by the respective waveforms.

The first display control means of the present monitoring apparatus capable of controlling the display device to display the waveforms of the plurality of operating parameters including the selected four parameters (selected from among the material injection speed and pressure, mold clamping pressure, amount of backward movement of the movable mold half and position of the injecting screw) permits the machine operator to efficiently check the injection molding operation for any abnormality or undesirable phase of the operating condition of the machine. The monitoring of the selected at least four operating parameters as displayed on the display device under the control of the first display control means makes it possible to facilitate the quantity control of the molded products on the basis of the operating condition of the machine during an injection molding operation. The monitoring apparatus further permits selective display of only a particular operating parameter or parameters on the display device, depending upon the specific injection molding requirement or the specific product (specific type of disc substrate) to be molded.

In an injection molding operation to mold a disc substrate, the point of time at which the sprue gate of the mold device is closed has a considerably large influence on the quality of the molded product. In the present monitoring apparatus including the second display control means, the first point of time at which the sprue gate is closed is indicated on the display device, together with the waveforms of the plurality of operating parameters including the selected at least four operating parameters as displayed under the control of the first display control means. This arrangement assures further optimization of the injection molding condition of the machine for further improving the consistency in the quality of the molded products. In this respect, it is noted that if the sprue gate of the mold device is closed at an excessively early point of time in the injection molding cycle, this closing timing of the sprue gate would cause termination of the material injection into the mold cavity in the process of compression of the material within the mold cavity with the mold clamping pressure applied to the mold device. Although the termination of the material injection at this point of time is effective to prevent a reverse flow of the material out of the mold cavity due to the pressure of the material, and reduce the degree of double refraction and a weight variation of the molded disc substrate, thereby improving the quality consistency of the molded product, the above-indicated termination may result in drawbacks such as deteriorated accuracy of transfer of information from a stamper to the molded disc, and generation of burrs extending from the edge of a center hole cut through the molded disc substrate, which would take place due to a flow of the molten material (molten resin material) into a gap between the male and female cutter sleeves which are used to cut the center hole and to close the sprue gate as indicated above. Since the present monitoring apparatus is adapted to indicate the point of time of the sprue gate closing on the display device, the timing of closing the sprue gate can be easily optimized by checking the quality of the molded product in relation to the timing indicated on the display device.

According to a first preferred form of the first aspect of the invention indicated above, the monitoring apparatus further comprises third display control means for controlling the display device to indicate a second point of time at which the pressure of injection of the material into the mold cavity is reduced from an initial level to a hold level, such that the second point of time is indicated together with the first point of time. In each injection molding cycle, the material injection pressure is generally reduced from the initial level to the hold level lower than the initial level. The second point of time at which the injection pressure is reduced has a large influence on the quality of the molded disc substrate. Since the hold level at which the injection pressure is kept is lower than the initial level, the accuracy of information transfer from the stamper to the molded disc can be improved and the injection cycle time can be reduced, by retarding the second point of time at which the injection pressure is reduced to the hold level, and by increasing the injection speed. However, the retarding this second point of time and increasing the injection pressure have a risk of causing a shrinkage of the molded disc substrate at its peripheral portion. The third display control means adapted to control the display device to indicate the second point of time facilitates the determination of the optimum timing of the injection pressure reduction so as to assure the high consistency in the quality of the molded product. The second point of time may be indicated in the same manner as the first point of time (at which the sprue gate is closed). Namely, The second point of time may be indicated by an appropriate symbol or character, preferably a straight line which is located at an appropriate position along the axis of the coordinate system along which the time is taken, and which straight line is parallel to the other axis of the coordinate system along which the values of the operating parameters are indicated by the respective waveforms.

According to another preferred form of the monitoring apparatus according to the first aspect of this invention, the first display control means and the second display control means are adapted to control the display device to display the waveforms of the above-indicated plurality of operating parameters and indicate the first point of time, respectively, during an injection molding cycle performed by the injection molding machine to mold the disc substrate. Where the third display control means is also provided, the first display control means, the second display control means and the third display control means may be adapted to control the display device to display the waveforms of the above-indicated plurality of operating parameters, and indicate the first and second points of time, respectively, during the injection molding cycle. Described differently, the waveforms of the operating parameters and the first point of time or the first and second points of time indicated above may be displayed or indicated on the display device in a real-time fashion while an injection molding operation is performed on the injection molding machine. This arrangement permits adequate monitoring of the injection molding operation by the operator, so that the operator may take a prompt measure to adjust or optimize the injection molding condition for improving the quality of the molded product. The real-time display of the operating parameters may be effected on the basis of the output signals of the appropriate sensors, without a time-consuming processing of those output signals by a process controller used for controlling the machine, so that the waveforms of the operating parameters may be displayed with a maximum substantial time delay of as short as about 50 msecs. It is possible to store a batch of image display data for displaying the operating parameters and the first point of time or first and second points of time for a plurality of injection molding cycles performed, so that the operation data of the two or more previous cycles are displayed one after another. Preferably, the image display data for each cycle are stored in a VRAM (video RAM), and are updated as the operating condition of the machine is optimized.

The second object indicated above may be achieved according to a second aspect of this invention, which provides an apparatus for controlling an operation of an injection molding machine adapted to mold a disc substrate by injection molding, the injection molding machine including a mold device having a stationary and a movable mold half which cooperate to define a mold cavity to be filled with a material to mold the disc substrate, and a sprue gate through which the material is injected into the mold cavity, the injection molding machine further including an injecting screw for injecting the material into the mold cavity through the sprue gate, the monitoring apparatus comprising a display device for displaying operation data relating to an operation of the machine, the control apparatus comprising: a monitoring apparatus including first and second display control means constructed according to the first aspect of the invention described above; and a sprue-gate-closing data input device for setting the first point of time at which the sprue gate is closed, as a time period from a second point of time at which the pressure of injection of the material into the mold cavity is reduced from an initial level to a hold level lower than the initial level.

In the control apparatus constructed according to the second aspect of this invention, the operator of the injection molding machine can monitor the waveforms of the operating parameters and the first and second points of time displayed and indicated on the display device. The machine operator adjusts the first point of time at which the sprue gate is closed, depending upon the quality of the actually molded disc substrate. Thus, the present control apparatus permits easy and accurate adjustment of the timing at which the sprue gate of the mold device is closed, so that the consistency in the quality of the molded product is improved. It is also noted that the cooling of the mold device to cool the material within the mold cavity is generally initiated when the pressure of injection of the material into the mold cavity is reduced from the initial level to the predetermined hold level. In the present control apparatus, the sprue-gate-closing data input device is arranged to set the first point of time at which the sprue gate is closed, as a time period from a second point of time at which the pressure of injection of the material into the mold cavity is reduced from the initial level to the hold level lower than the initial level. This arrangement assures easier and optimum adjustment of the closing timing of the sprue gate, for further improvement in the quality of the molded product. Preferably, the monitoring apparatus includes third display control means for controlling the display device to indicate the second point of time at which the pressure of injection of the material into the mold cavity is reduced from the initial level to the hold level.

According to one preferred form of the second aspect of this invention, the control apparatus further comprises a pressure-rise initiation data input device for setting a third point of time at which a rise of the clamping pressure of the mold device is initiated, as a time period from a fourth point of time at which the injection of the material into the mold cavity is initiated. In this respect, it is noted that it is desirable to initiate the injection of the material into the mold cavity when the clamping pressure of the mold device is substantially zero, and initiate the rise of the mold clamping pressure shortly after the moment of initiation or completion of the injection of the material into the mold cavity, for assuring a high degree of consistency in the quality of the molded product, particularly where the product is a substrate of a digital video disc (DVD). The accuracy of information transfer from a stamper of the mold device to the information-bearing surface of the molded disc can be improved, and the injection molding cycle time can be shortened, by suitably adjusting the time period from the point of time at which the material injection in initiated, to the point of time at which the rise of the clamping pressure of the mold device is initiated. Thus, the control apparatus including the pressure-rise initiation data input device makes it possible to accurately and easily set or adjust the initiation timing of the mold clamping pressure, while observing the operation data of the injection molding machine, so that the consistency in the quality of the molded product is maintained a sufficiently high level.

The third object indicated above may be achieved according to a third aspect of this invention, which provides a method of monitoring an operating condition of an injection molding machine adapted to mold a disc substrate by injection molding, the injection molding machine including a mold device having a stationary and a movable mold half which cooperate to define a mold cavity to be filled with a material to mold the disc substrate, and a sprue gate through which the material is injected into the mold cavity, the injection molding machine further including an injecting screw for injecting the material into the mold cavity through the sprue gate, wherein operation data relating to an operation of the machine are displayed on a display device, the method comprising the steps of: detecting a plurality of operating parameters of the injection molding machine on the basis of output signals of sensors provided on the machine, the above-indicated plurality of operating parameters including at least four operating parameters selected from a group consisting of a speed of injection of the material into the mold cavity, a pressure of injection of the material into the mold cavity, a clamping pressure of the mold device, an amount of backward movement of the movable mold half, and a position of the injecting screw; detecting a point of time at which the sprue gate is closed; simultaneously or selectively displaying waveforms of the above-indicated plurality of operating parameters detected, on the display device, the waveforms representing chronological changes of values of the plurality of operating parameters, respectively; and controlling the display device to indicate the point of time at which the sprue gate is closed, such that the point of time is indicated together with the waveforms of the above-indicated plurality of operating parameters displayed on the display device.

The fourth object indicated above may be achieved according to a fourth aspect of this invention, which provides a recording medium which is accessible by a computer and which stores a control program to be executed by the computer to practice a method of monitoring an operating condition of an injection molding machine adapted to mold a disc substrate by injection molding, the injection molding machine including a mold device having a stationary and a movable mold half which cooperate to define a mold cavity to be filled with a material to mold the disc substrate, and a sprue gate through which the material is injected into the mold cavity, the injection molding machine further including an injecting screw for injecting the material into the mold cavity through the sprue gate, wherein operation data relating to an operation of the machine are displayed on a display device, the method comprising the steps of: detecting a plurality of operating parameters of the injection molding machine on the basis of output signals of sensors provided on the machine, the above-indicated plurality of operating parameters including at least four operating parameters selected from a group consisting of a speed of injection of the material into the mold cavity, a pressure of injection of the material into the mold cavity, a clamping pressure of the mold device, an amount of backward movement of the movable mold half, and a position of the injecting screw; detecting a point of time at which the sprue gate is closed; simultaneously or selectively displaying waveforms of the above-indicated plurality of operating parameters detected, on the display device, the waveforms representing chronological changes of values of the plurality of operating parameters, respectively; and controlling the display device to indicate the point of time at which the sprue gate is closed, such that the point of time is indicated together with the waveforms of the above-indicated plurality of operating parameters displayed on the display device.

BRIEF DESCRIPTION OF THE DRAWINGS

The above and other objects, features, advantages and technical and industrial significance of this invention will become more apparent by reading the following detailed description of a presently preferred embodiment or mode of the invention, when considered in connection with the accompanying drawings, in which.

DETAILED DESCRIPTION OF THE PREFERRED EMBODIMENT

Figure 1:
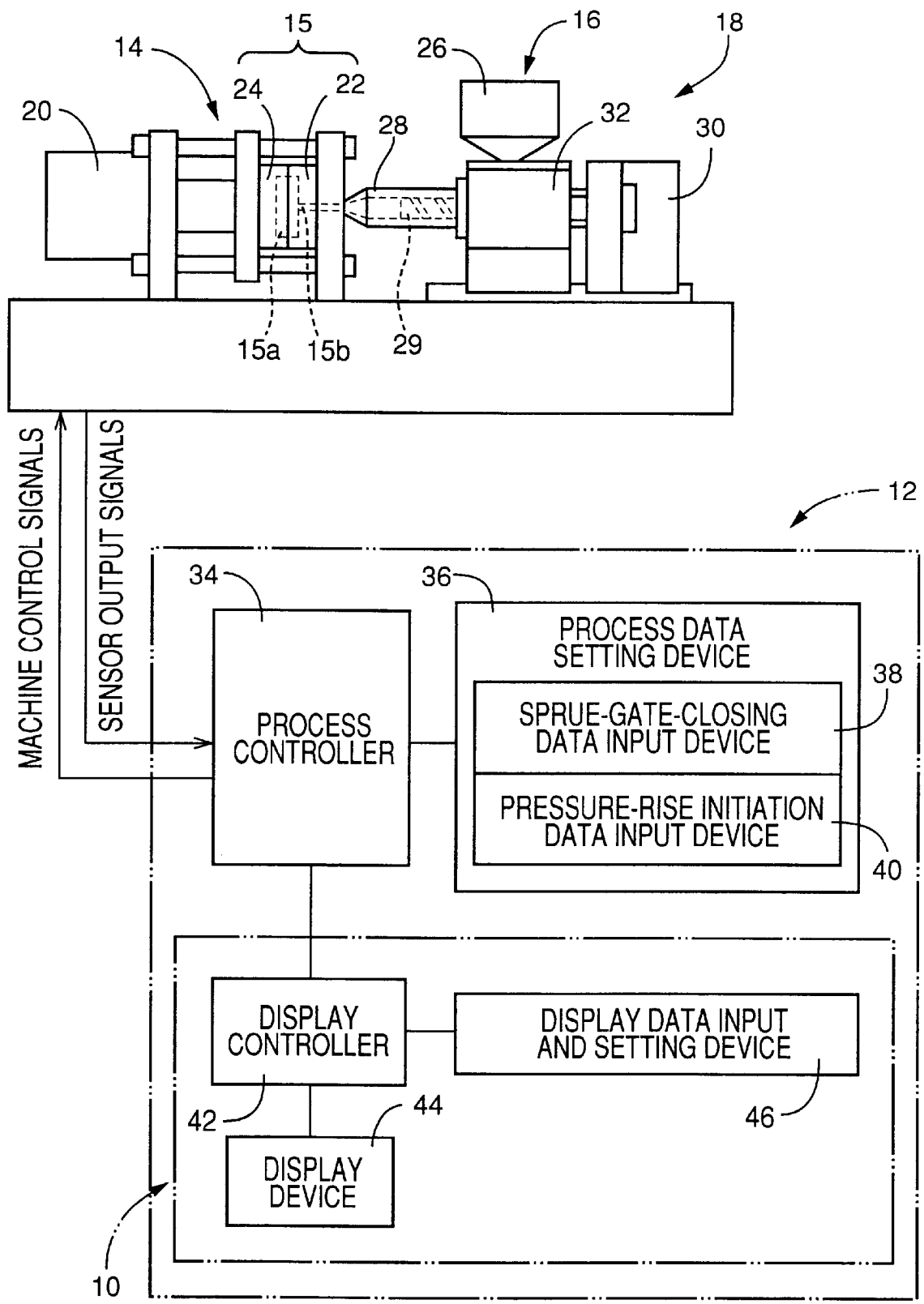
FIG. 1 is a view schematically illustrating an injection molding system for injection molding a disc substrate, which system includes a monitoring apparatus and a machine control apparatus that are constructed according to one embodiment of this invention.

Referring first to FIG. 1, there is shown an injection molding system constructed to mold a disc substrate by injection molding. The injection molding system includes an injection molding machine 18 and a machine control system 12 for controlling an operation of the injection molding machine 18. The machine control system 12 incorporates a monitoring apparatus 10 constructed according to one embodiment of this invention. The injection molding machine 18 has a construction as well known in the art, including a mold clamping device 14, a mold device 15, and an injecting device 16. The mold device 15 includes a stationary mold half 22 and a movable mold half 24 which are supported by the mold clamping device 14. The stationary and movable mold halves 22, 24 cooperate to define therebetween a mold cavity 15a having a geometry corresponding to that of the disc substrate to be molded. The mold clamping device 14 includes a hydraulically or electrically operated mold clamping mechanism 20 which is adapted to move the movable mold half 24 relative to the stationary mold half 22, for thereby opening and closing the mold device 15.

The injecting device 16 is an in-line screw type injecting device which includes a hopper 26 for storing a resin material, and a heating sleeve 28 communicating at its rear end with the hopper 26. The heating sleeve 28 accommodates an injecting screw 29 which is adapted to receive the resin material supplied from the hopper 26 and feed the resin material into the mold cavity 15a in the mold device 15. The injecting device 16 further includes a rotary drive mechanism 30 equipped with a hydraulic motor for rotating the injecting screw 29 within the heating sleeve 28, and an axial drive mechanism 32 equipped with a hydraulic cylinder for moving the injecting screw 29 in the axial direction. With the injecting screw 29 rotated by the rotary drive mechanism 30 and advanced by the axial drive mechanism 32, the resin material heated into a molten state within the heating sleeve 28 is fed forward under a suitable back pressure, and injected into the mold cavity 15a through a nozzle provided at the front end of the heating sleeve 28.

In operation of the thus constructed injection molding machine 18 for molding the disc substrate, the stationary and movable mold halves 22, 24 of the mold device 15 are held at a predetermined elevated temperature, and the nozzle of the heating sleeve 28 is held in communication with the interior of a sprue bushing extending through the stationary mold half 22 of the mold device 15. In this condition, the mold clamping mechanism 20 is first activated to close the mold device 15 such that the movable mold half 24 is initially traversed at a relatively high speed toward the stationary mold half 22, and is then moved at a relatively low speed to bring the movable mold half 24 into fluid-tight contact with the stationary mold half 22, for thereby defining the mold cavity 15*a* which communicates with the nozzle through the sprue bushing in the stationary mold half 22.

While the mold device 15 is in the process of being closed by the mold clamping mechanism 20, the injecting screw 29 is rotated by the rotary drive mechanism 30 so that an amount of the resin material suitable for molding the disc substrate in one injection molding cycle is introduced into the heating sleeve 28, heated therein into a molten state, advanced to the front end portion of the heating sleeve 28 and stored therein before the molten resin material is injected into the mold cavity 15*a*. At a suitably determined point of time, the axial drive mechanism 32 is activated to advance the injecting screw 29 to force the molten resin material into the mold cavity 15*a* through the sprue bushing. Substantially simultaneously with or a shortly after the initiation of the advancing movement of the injecting screw 29 within the heating sleeve 28, the clamping mechanism 20 applies a mold clamping pressure between the stationary and movable mold halves 22, 24. Namely, the movable mold half 24 is moved back away from the stationary mold half 22 by a relatively small amount, as indicated at 4 in the graph of FIG. 3, by the pressure of the molten resin material (hereinafter referred to as "injection pressure") generated by the advancing movement of the injecting screw 29 by the axial drive mechanism 32. The clamping mechanism 20 is activated to force the thus moved movable mold half 24 onto the stationary mold half 22, for thereby pressurizing a mass of the molten resin material which has been injected into the mold cavity 15*a*. The mold clamping pressure is raised as indicated at 3 in the graph of FIG. 3. This pressure is represented by the hydraulic pressure generated by the hydraulic motor of the mold clamping mechanism 20.

Figure 3:
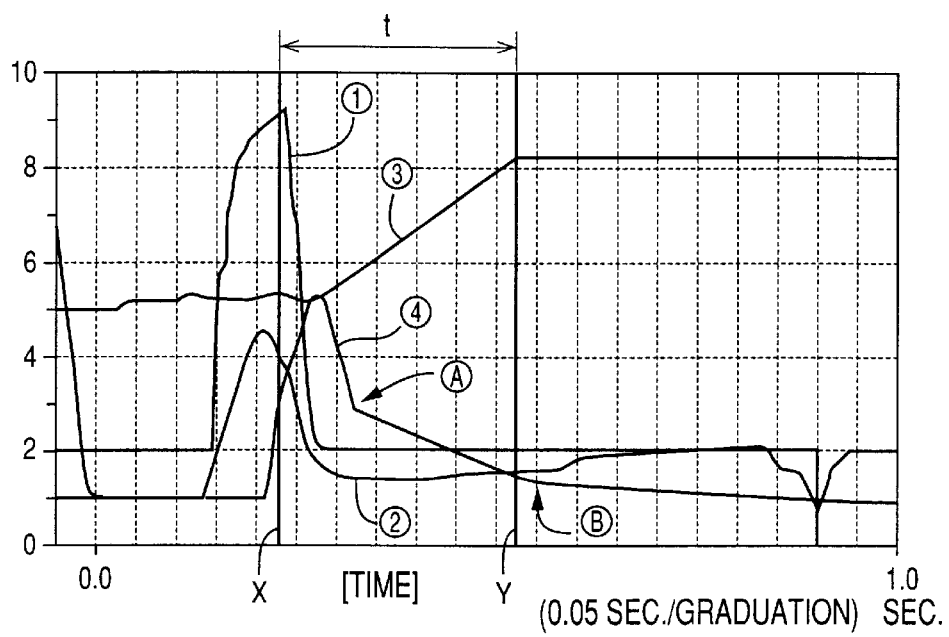
FIG. 3 is a view showing an example of operation data provided on a display screen of the monitoring apparatus.

The injection pressure generated by the injecting device 16 is controlled such that the injection pressure is first raised to an initial level upon initiation of the injection of the resin material into the mold cavity 15*a*, and is then reduced to a hold level at which the injection pressure is held for the subsequent period of the injection molding cycle, as indicated at 2 in the graph of FIG. 3. The injection pressure is represented by the hydraulic pressure in the hydraulic cylinder of the axial drive mechanism 32. Substantially simultaneously with or shortly after the initiation of the reduction of the injection pressure of the injecting device 16, or substantially simultaneously with the initiation of the rise of the mold clamping pressure by the mold clamping mechanism 20, cooling of the stationary and movable mold halves 22, 24 is initiated to start cooling the resin material filling the mold cavity 15*a*. In this cooling step, a cutter in the form of a male cutter sleeve extending through a central portion of the movable mold half 24 is advanced to close a sprue gate 15*b* provided at the inner end of the sprue bushing which extends through a central portion of the stationary mold half 22. As a result, the mold cavity 15*a* is closed while being disconnected from the sprue gate 15*b* of the sprue bushing. A female cutter sleeve is mounted on the sprue bushing, and the male cutter sleeve indicated above is disposed coaxially with the female cutter sleeve so that the opposed end portions of the male and female cutter sleeves cooperate to cut a center hole through a central portion of the disc substrate molded in the mold cavity 15*a*, when the male cutter sleeve is moved toward the female cutter sleeve. Since the end portion of the male cutter sleeve slightly engages with the end portion of the female cutter sleeve at the end of the advancing movement of the male cutter sleeve to cut the center hole in the molded disc substrate, the sprue gate or nozzle 15*b* at the inner end of the sprue bushing is closed by the end face of the male cutter sleeve.

After the resin material filling the mold cavity 15*a* has been cooled and solidified, the clamping mechanism 20 of the mold clamping device 14 is activated to move the movable mold half 24 away from the stationary mold half 22 to open the mold device 15. Then, an ejector sleeve provided in the stationary or movable mold half 22, 24 is advanced to remove the molded disc substrate from the mold device 15. Thus, one injection molding cycle or shot is completed.

The operations of the mold clamping device 14 and the injecting device 16 of the injection molding machine 18 to perform continuous production of the disc substrates are controlled by a process controller 34 of the machine control system 12. The process controller 34, which may be a known controller used for an injection molding machine, incorporates a central processing unit (CPU), a read-only memory (ROM) and a random-access memory (RAM). The machine control system 12 further includes an input device in the form of a process data setting device 36 which permits the operator of the injection molding system to set operation data or various operating parameters of the machine 18. The CPU of the process controller 34 is adapted to perform processing operations based on the values of the operating parameters received from the process data setting device 36 or the predetermined values stored in the RAM, according to control programs stored in the ROM, for generating various control signals for suitably controlling the clamping mechanism 20 of the mold clamping device 14 and the rotary and axial drive mechanisms 30, 32 of the injecting device 16. While the process controller 34 may be arranged to control the clamping and injecting devices 14, 16 in an open-loop manner, it is desirable to control these devices 14, 16 in a closed-loop or feedback manner on the basis of the output signals of various sensors provided on the devices 14, 16.

The process controller 34 is arranged to control hydraulic and electric circuits for operating the mold clamping device 14 and the injecting device 16, more specifically, for controlling the injecting speed, rotating speed, and injection pressure of the injecting screw 29 of the injecting device 16, opening and closing actions and mold clamping pressure of the mold clamping device 14, and heating and cooling operations of the stationary and movable mold halves 22, 24. These operating parameters are controlled so as to change according to desired patterns represented by the operation data which have been set or entered through and received from the process data setting device 36. For instance, the operation data to be set through the process data setting device 36 in relation to the injecting device 16 include: injecting speed (velocity of the advancing movement of the injecting screw 29 in the heating sleeve 28); initial level and hold level of the injection pressure; rotating speed of the injecting screw 29; back pressure of the injecting screw 29; amount of injection of the resin material to be injected into the mold cavity 15*a* (which amount is determined by the initial position of the injecting screw 29); and various time periods set by timers, such as a waiting time from the termination of one injection molding cycle to the initiation of the next cycle.

On the other hand, the operation data to be set through the process data setting device 36 in relation to the mold clamping device 14 may include: opening and closing speed of the mold device 15; clamping pressure of the mold device 15; opening and closing amount of the mold device 15; and various time periods set by timers, such as a cooling time period of the mold halves 22, 24, and points of time at which compressed air is blown and the ejector sleeve is advanced, to remove the molded disc substrate from the mold halves 22, 24. While the operating parameters to be set through the setting device 36 have been indicated for illustrative purpose only, all of these parameters need not be set through the setting device 36, and some of the parameters may be set by directly manipulating appropriate flow control valves in the hydraulic circuits or appropriate timers in the electric circuits. Further, the electric circuits may include various sensors, detectors and switches, such as limit switches for detecting predetermined operating positions of some components of the machine 18.

In the present embodiment of the invention, the process data setting device 36 includes a sprue-gate-closure data input device 38 and a pressure-rise initiation data input device 40. The sprue-gate-closure data input device 38 is provided to set a point of time at which the sprue gate 15b of the sprue bushing indicated above is closed, more specifically, a point of time at which a control signal for initiating the advancing movement of the male cutter sleeve toward the female cutter sleeve to close the sprue gate 15b. For instance, this point of time at which the advancing movement of the male cutter sleeve is initiated is set as a time period from a reference point of time, for instance, from a point of time at which the injection pressure is reduced from the initial level to the hold level. The time period from the reference point of time may be zero. This manner of setting of the point of time of initiating the closing of the sprue gate 15b based on the point of time at which the injection pressure is reduced to the hold level is advantageous in that the degrees of cooling and solidification of the molten resin material in the mold cavity 15a substantially depend upon the time lapse after the point of time at which the injection pressure is lowered from the initial level to the hold level. A study in this respect revealed that the cooling and solidification degrees of the molten resin material upon closing of the sprue gate 15b have a considerably large influence on the quality of the molded product, namely, molded disc substrate. Accordingly, by closing the sprue gate 15b at a point of time which is determined as a time delay from the point of time at which the injection pressure reduced to the hold level, it is possible to accurately and easily estimate the cooling and solidification degrees of the resin material, and therefore the quality of the molded product. Thus, the injection molding of the disc substrate can be easily and accurately monitored to assure a high degree of consistency in the quality of the product.

The point of time at which the injection pressure is reduced from the initial level to the hold level may be set as a time period from the moment of initiation of the injection of the resin material into the mold cavity 15a. For instance, this point of time is preferably set as a time period from the moment at which the injection screw 29 has been advanced to a predetermined reference position. In this case, the point of time at which the sprue gate 15b is closed is set as a time period from the moment at which the injection screw 29 has been advanced to the reference position.

The pressure-rise initiation data input device 40 is provided to set a point of time at which a control signal is made for initiating a rise of the mold clamping pressure. This point of time is also set as a time period from a predetermined reference point of time, for instance, from the moment of initiation of the injection of the resin material, or from a point of time at which the velocity of the advancing movement of the injection screw 29 is zeroed, namely, from a point of time at which the injection of the resin material into the mold cavity 15a is completed. The time period indicated above may be zero. This manner of setting of the point of time of initiating the rise of the mold clamping pressure based on the moment of initiation or completion of the injection of the resin material is advantageous in that the condition of filling of the mold cavity 15a with the resin material when the rise of the mold clamping pressure is initiated can be relatively easily estimated when the injection is initiated or completed. In this respect, it is noted that the rise of the mold clamping pressure is desirably initiated shortly after the moment of initiation or completion of the injection of the resin material into the mold cavity 15a, where the substrate of a digital video disc (DVD) is molded. A study in this connection revealed that the time period from the moment of initiation or completion of the injection to the moment of initiation of the rise of the mold clamping pressure has a considerably large influence on the quality of the molded DVD substrate. Accordingly, by initiating the rise of the mold clamping pressure at a point of time which is determined as a time delay from the moment of initiation or completion of the injection, it is possible to accurately and easily estimate the mold filling condition, and therefore the quality of the molded product. Thus, the injection molding of the disc substrate can be easily and accurately monitored to assure a high degree of consistency in the quality of the product.

The operation data of the injection molding machine 18 controlled by the process controller 34 during an injection molding operation are displayed by the monitoring apparatus 10 of the machine control system 12, in such a manner as to permit the user or operator of the machine 18 to easily recognize or understand the displayed operation data. To this end, the monitoring apparatus 10 includes a display controller 42, a display device 44 and a display data input and setting device 46, as well as a central processing unit (CPU), a read-only memory (ROM) and a random-access memory (RAM). The display controller 42 is adapted to receive from the process controller 34 signals representative of the operation data obtained by the process controller 34. The CPU of the display controller 42 processes these operation data signals to obtain image display data, according to control programs stored in the ROM, while utilizing a temporary data storage function of the RAM. Based on the thus obtained image display data, the display controller 42 controls the display device 44 to display images representative of the operation data of the machine 18 in operation. The RAM of the display controller 42 is adapted to store a batch of image display data corresponding to one injection molding cycle or a portion of the cycle. The display controller 42 may use a VRAM.

The operation data signals received by the display controller 42 represent operating parameters whose values vary with the time in the process of fabrication of the disc substrates in successive injection molding cycles on the injection molding machine 18. These operating parameters to be monitored by the monitoring apparatus 10 include a plurality of parameters including at least four parameters selected from the group consisting of: (1) the injection speed; (2) the injection pressure; (3) the amount of backward movement of the movable mold half 24; (4) the mold clamping pressure; and (5) the position of the injecting screw 29. Preferably, the operating parameters to be monitored include the (1) the injection speed and the (2) the injection pressure. More preferably, the operating parameters include the (3) the amount of backward movement of the movable mold half 24. Most preferably, the operating parameters further include the (4) the mold clamping pressure. However, the operating parameters to be monitored advantageously include (5) the position of the injecting screw 29 as well as the above-indicated four parameters, or in place of the injection speed. The above-indicated five operating parameters are all detected directly by respective sensors or obtained indirectly on the basis of the output signals of the sensors. The injection pressure may include the back pressure of the injecting screw 29, as well as the pressure applied to the molten resin material by the advancing movement of the injecting screw 29. To obtain the values of the selected operating parameters, the machine control system 12 includes circuits for the display controller 42 to receive the output signals of the sensors provided on the machine 18. For example, these sensors may include a sensor for detecting the position of the injecting screw 29, a sensor for detecting the injection pressure, a sensor for detecting an opening and closing amount of the mold device 15 (a sensor for detecting the amount of the backward movement of the movable mold half 24), and a sensor for detecting the mold clamping pressure. Since the opening and closing actions of the mold device 15 and the axial movement of the injecting screw 29 are achieved by the respective hydraulic actuators (hydraulic motor and cylinder), the sensors for detecting the injection pressure and the mold clamping pressure may be appropriate hydraulic pressure sensors. Further, the sensors for detecting the position of the injecting screw 29 and the amount of the backward movement of the movable mold half 24 may be rotary encoders. The injection speed may be calculated as a rate of change of the position of the injecting screw 29, namely, from the output signal of the sensor for detecting the position of the injecting screw 29. Preferably, digital signals representative of the values of the selected operating parameters obtained on the basis of the output signals of the sensors are applied to the display controller 42, without complicated processing of the output signals by the process controller 34. Where a sensor generates an analog output signal, this analog signal is converted by an A/D converter into a digital signal, which is received by the process controller 34.

Each of the operation data signals is obtained on the basis of the output signal of the corresponding sensor, at a relatively short time interval, and is processed by the display controller 42, so that the corresponding operating parameter is displayed on the display device 44 as a visible continuous waveform, which represents a relationship between the value of the operating parameter and the time in the injection molding cycle in question, as indicated in the graph of FIG. 3. The display controller 42 receives from the display data input and setting device 46 a signal indicating at least one of the selected at least four operating parameters described above, so that the selected at least one operating parameter is displayed on the display device 44. Namely, the display data input and setting device 46 permits the operator to select at least one of the at least four operating parameters indicated above. The display device 44 is adapted to display the waveforms of the different operating parameters in respective different colors or with respective different types of lines (solid, dashed, one-dot chain lines, etc.) or with respective lines having different thickness values, so that the displayed waveforms can be readily distinguished from each other. The display controller 42 is further adapted to receive from the display data input and setting device 46 signals which designate or select a desired display mode, more specifically, designate the desired image magnification or contraction scale, the reference positions of the waveforms (initial values of the displayed operating parameters), and the colors or types or thickness values of the lines indicated above.

The display controller 42 is adapted to receive from the process controller 34 an injection-pressure-reduction initiation signal and a sprue-gate-closure initiation signal, which are part of the machine control signals for controlling the operation of the injection molding machine 18. The injection pressure reduction initiating signal is generated to initiate the reduction of the injection pressure from the initial level down to the hold level, as described above. The sprue-gate-closure initiation signal is generated to initiate the advancing movement of the male cutter sleeve toward the female cutter sleeve for closing the sprue gate 15b provided at the inner end of the sprue bushing extending through the stationary mold half 22, as described above. These two initiating signals are processed by the display controller 42 into image display data on the basis of which the points of time at which the reduction of the injection pressure and the closing of the sprue gate 15b are initiated are indicated in a rectangular coordinate system having two mutually perpendicular axes on the screen of the display device 44. More specifically, the above-indicated points of time are indicated along the abscissa of the rectangular coordinate system on the screen of the display device 44. In this coordinate system, the time is taken along the abscissa while the values of the operating parameters are taken along the ordinate, as shown in FIG. 3.

It will be understood from the foregoing description of the present embodiment that the display controller 42 functions as first display control means for controlling the display device 44 to display the operation data (operating parameters), second display control means for controlling the display device 44 to indicate the point of time at which the closing of the sprue gate 15b is initiated, and third display control means for controlling the display device 44 to indicate the point of time at which the reduction of the injection pressure from the initial level to the hold level is initiated.

Referring next to the flow chart of FIG. 2, there will be described a display control routine executed by the monitoring apparatus 10 during an operation of the injection molding system to mold the disc substrate.

The display control routine is initiated with step S1 to set the number of injection molding cycles to be performed on the injection molding machine 18. This number is set on the basis of the number stored in the process controller 34 or the number specified through the display data input and setting device 46. Step S1 is followed by step S2 to set the content to be displayed on the display device 44, and the display mode, more specifically, the operating parameters to be displayed, the colors and/or the types or thickness values of the waveform lines corresponding to the operating parameters. If necessary, the manner in which the points of time of initiation of the injection pressure reduction and the sprue gate closing are indicated on the display device 44 is also set or specified in step S2.

Upon initiation of an injection molding cycle, the control flow goes to step S3 to erase the image display data which were stored in the RAM or VRAM of the display controller 42 in the last injection molding cycle to display the selected operating parameters and indicate the points of time of initiation of the injection pressure reduction and the sprue gate closing. Step S3 is followed by step S4 to sequentially process the operation data signals received from the process controller 34 from time to time, in order to obtain the corresponding image display data. Then, the control flow goes to step S5 to control the display device 44 for displaying the operation data on the basis of the image display data. It will be understood that step S3 includes a step of obtaining the operation data signals on the basis of the output signals of the sensors as processed by the process controller 34, or a step of detecting the operation data, while step S4 is a step of obtaining the image display data on the basis of the operation data signals. It will also be understood that steps S4 and S5 cooperate to provide a step of displaying the operation data.

Then, the control flow goes to step S6 to determine whether the injection pressure reduction initiating signal has been generated by the process controller 34, namely, has been received by the display controller 42. If an affirmative decision (YES) is obtained in step S6, the control flow goes to step S7 in which the point of time of the initiation of the injection pressure reduction from the initial level to the hold level is indicated at an appropriate position along the abscissa of the coordinate system on the screen of the display device 44, according to image display data obtained on the basis of the injection pressure reduction initiating signal as processed by the display controller 42. If a negative decision (NO) is obtained in step S6, the control flow goes to step S10 (which will be described), skipping steps S7–S9.

Step S7 is followed by step S8 to determine whether the sprue-gate-closure initiating signal has been generated by the process controller 34, namely, has been received by the display controller 42. If an affirmative decision (YES) is obtained in step S8, the control flow goes to step S9 in which the point of time of the initiation of the closing of the sprue gate 15*b* is indicated at an appropriate position along the abscissa of the coordinate system on the screen of the display device 44, according to image display data obtained on the basis of the sprue-gate-closure initiating signal as processed by the display controller 42. If a negative decision (NO) is obtained in step S8, the control flow goes to step S10, while skipping step S9.

It will be understood that step S8 is a step of detecting the point of initiation of the closing of the sprue gate 15*b*, while step S9 is a step of indicating the point of time the initiation of the closing of the sprue gate 15*b* on the display device 44, according to the image display data obtained on the basis of the sprue-gage-closure initiating signal as processed by the display controller 42.

Step S10 is provided to store in the VRAM of the display controller 42 the image display data for displaying the operating parameters, and the image display data for indicating the points of time of initiation of the reduction of the injection pressure and the closing of the sprue gate 15*b*, if the operations to initiate the above-indicated reduction and closing have been initiated. Then, the control flow goes to step S11 to determine whether the present injection molding cycle is completed. This determination in step S11 may be made on the basis of an output signal of a suitable time which is adapted to measure a time lapse after the initiation of the injection molding cycle. If a negative decision (NO) is obtained in step S11, the control flow goes back to step S4 and repeat steps S4–S11, until an affirmative decision (YES) is obtained in step S11. As a result, the operation data in the injection molding cycle are obtained from time to time at the predetermined time interval, so that the waveforms of the selected operating parameters are displayed on the display device 44, while the points of time of the initiation of the injection pressure reduction and the sprue gate closing are indicated at the appropriate positions along the abscissa along which the time is taken. Described in more detail, the right ends of the waveforms of the operating parameters are moved along the abscissa as the time passes during the injection molding cycle, until the cycle is completed, so that each waveform displayed at the end of the cycle shows a chronological change of the value of the corresponding operating parameter during the cycle. Further, the points of time at which the injection pressure reduction and the closing of the sprue gate 15*b* were initiated during the cycle are kept indicated at the appropriate positions along the abscissa. The present monitoring apparatus 10 permits the operation data signals to be processed by the display controller 42 to display the operation data on the display device 44, without requiring the process controller 34 to effect a special processing of the operation data signals as obtained on the basis of the output signals of the sensors. Generally, one injection cycle is completed in a few seconds. The monitoring apparatus 10 is capable of displaying the operation data with a time delay of only several tens of microseconds with respect to the points of time at which the various events actually take place in the injection molding cycle. Thus, the apparatus 10 permits substantially real-time displaying of the operation data in the process of the injection molding cycle.

If an affirmative decision (YES) is obtained in step S11, that is, if the present injection molding cycle is competed, the control flow goes to step S12 to determine whether the injection molding cycles have been performed the number of times which was set in step S1. If a negative decision (NO) is obtained in step S12, the control flow goes to step S3 to initiate the processing for displaying the operation data in the next injection molding cycle. If an affirmative decision (YES) is obtained in step S12, the execution of the present display control routine is terminated. Thus, the operation data are displayed on the display device 44 in each injection molding cycle, together with the indication of the points of time at which the reduction of the injection pressure to the hold level and the closing of the sprue gate 15*b* are initiated.

Figure 2:
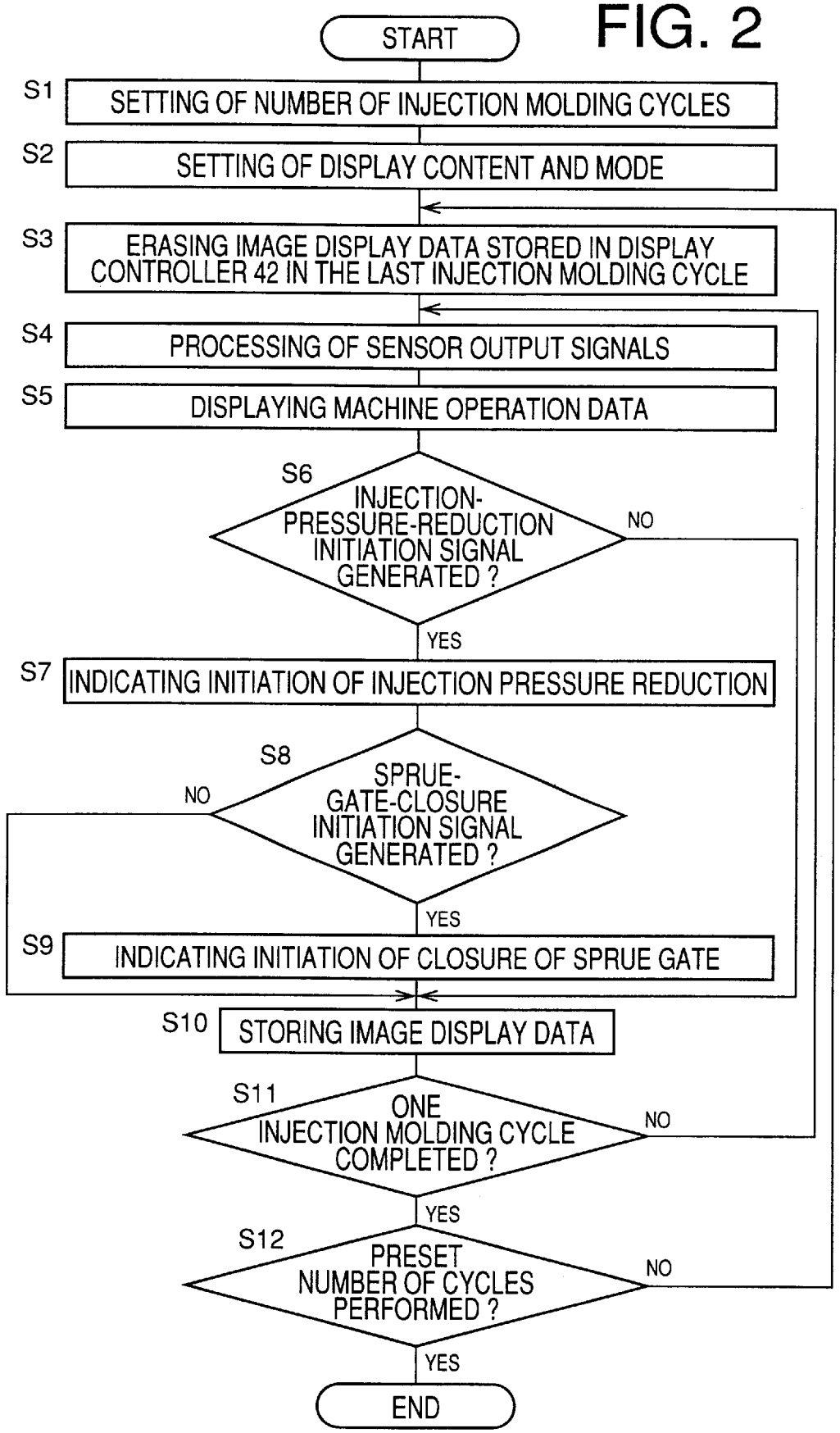
FIG. 2 is a flow chart illustrating a display control routine executed by the monitoring apparatus to display operation data of the injection molding system.

There is shown in FIG. 3 an example of the display content provided on the screen of the display device 44 according to the display control routine of FIG. 2. The display content includes the graph in the rectangular coordinate system, showing the waveforms of the selected four operating parameters, namely, injection speed, injection pressure, mold clamping pressure and amount of backward movement of the movable mold half 24, which are indicated at 1, 2, 3 and 4 in the graph. In the coordinate system, the value 0 of the abscissa corresponds the beginning of the injection molding cycle initiated upon generation of a cycle start signal. The display content further includes lines X and Y parallel to the ordinate. The line X represents the point of time at which the injection-pressure-reduction initiation signal is generated, while the line Y represents the point of time at which the sprue-gate-closure initiation signal is generated. A decrease in the rate of reduction of the amount of backward movement of the movable mold half 24, indicated at A on the waveform 4, indicates the point of time at which the mold cavity 15*a* is filled with the molten resin material during a continuous rise of the mold clamping pressure. A further decrease of the amount of backward movement of the movable mold half 24 indicated at B on the waveform 4 indicates the point of time at which the sprue gate 15*b* is closed by the advancing movement of the male cutter sleeve into engagement with the female cutter sleeve, so that flows of the molten resin material into and from the mold cavity 15a are prevented. On the display screen, the waveforms 1–4 and the lines X and Y are indicated in respective different colors.

It will be understood from the foregoing explanation by reference to FIGS. 2 and 3 that the monitoring apparatus 10 of the present injection molding system is capable of displaying the operation data of the injection molding machine 18 in a real-time fashion, enabling the machine operator to easily monitor and control the injection molding operation while observing the display content provided on the display device 44. Therefore, the present monitoring apparatus 10 permits prompt adjustment of the injection molding condition by appropriate manipulation by the machine operator. The monitoring apparatus 10 permits the machine operator to select at least four operating parameters selected from among (1) the injection speed, (2) the injection pressure, (3) the amount of backward movement of the movable mold half 24, (4) the mold clamping pressure, and (5) the position of the injection screw 29. The selected at least four operating parameters may be either simultaneously or selectively displayed in the rectangular coordinate system wherein the values of the parameters are taken along the ordinate while the time is taken along the abscissa. This arrangement permits easier and more accurate analysis and control of the operating parameters of the injection molding machine 18. Further, the adjustments of the timings of initiating the injection pressure reduction and the sprue gate closing can be facilitated by the indication of the points of generation of the appropriate initiation signals, which are taken along the abscissa, that is, along the axis of the time.

Where the mold device 15 uses a stamper which partially defines the mold cavity 15a and which bears information to be transferred onto an information-bearing surface of a disc to be molded by injection molding, the accuracy of transfer of the information from the stamper to the molded disc is improved with an increase in the injection speed, that is, with an increase in the rate at which the mold cavity 15a is filled with the molten resin material. However, an excessively high value of the injection speed tends to cause a local shrinkage of the resin material injected into the mold cavity 15a. To assure an optimum compromise between the accuracy of transfer of the information and the prevention of the material shrinkage, the injection speed and the point of time at which the injection pressure is reduced from the initial level to the hold level may be monitored on the display device 44, for appropriate adjustment of these parameters so as to assure a sufficiently slow filling of the mold cavity 15a in the final stage of the filling process. It is also noted that the tendency of the double refraction of the molded disc is reduced with an increase in the injection pressure or the compression pressure of the resin material in the mold cavity 15a. However, an excessively high injection pressure with a long mold clamping time leads to a decrease in the cooling efficiency and an increase in the required cooling time, resulting in deterioration of the injection molding cycle. To avoid this drawback, the rate of change of the amount of backward movement of the movable mold half 24 may be monitored on the display device 44, for optimizing the cooling time and the compression pressure of the injected resin material, and for analyzing the thickness of the molded disc substrate in relation to the amount of backward movement of the movable mold half 24.

It is also noted that initiating an increase in the mold clamping pressure after initiation of the injection of the resin material into the mold cavity 15a is desirable to improve the accuracy of transfer of the information from the stamper to the information-bearing surface of the molded disc. To achieve this desire, chronological changes in the injection speed and the mold clamping time may be monitored on the display device 44, to suitably determine the point of time at which a rise of the mold claiming pressure is initiated. It will further be noted that the tendency of the double refraction of the molded disc is reduced by advancing the timing at which the sprue gate 15b is closed, while an excessive advancement of this timing may deteriorate the accuracy of the information transfer, and may cause generation of burrs in the form of threads extending from the edge of the center hole cut through the molded disc substrate upon closing of the sprue gate 15b. To assure an optimum compromise between these factors, the rate of change of the injection speed and the timing of closing of the sprue gate 15b may be monitored on the display device 44, to optimize the closing timing of the sprue gate 15b with respect to the change of the injection speed. In this respect, the present monitoring apparatus 10 permits the operator to manipulate the display data input and setting device 46 to enter a time "t" between the point of time of initiation of the injection pressure reduction and the point of time of initiation of the sprue gate closing, in order to specify the timing at which the sprue gate 15b is closed. Accordingly, the closing timing of the sprue gate 15b can be easily changed or optimized by using the display data input and setting device 46.

While the present invention has been described above in its presently preferred embodiment, for illustrative purpose only, it is to be understood that the invention is not limited to the details of the illustrated embodiment, and may be otherwise embodied.

For instance, the process controller 34 and the display controller 42 may be constituted by a single computer incorporating a central processing unit which is adapted to execute process control programs for controlling the operation of the injection molding machine 18 and the display control routine of FIG. 2.

The monitoring apparatus 10 may further include a printer or other recording device for producing a hard copy or other kinds of record of the display content which is provided on the display device 44 under the control of the display controller 42. The machine control system 12 may further include another display device for displaying various settings or operating conditions of the machine 18 which are currently established by the process controller 34.

The display controller 42 may be adapted to store in the VRAM image display data corresponding to each injection molding cycle or a portion of the cycle, so that the selected operating parameters and the points of time of initiation of the injection pressure reduction and the sprue gate closing are displayed or indicated on the display device 44, immediately after each injection molding cycle is completed. In this case, the operation data of the completed cycle can be utilized for optimizing the next cycle to assure a high degree of consistency in the quality of the molded products.

The principle of the present invention is equally applicable to the injection molding of various kinds of disc substrates such as CD (compact disc substrate) and MO (magneto-optical disc substrate), other than the DVD disc substrate.

It will be understood that the present invention may be embodied with various other changes, modifications and improvements, which may occur to those skilled in the art, without departing from the spirit and scope of the invention defined in the following claims:

What is claimed is:

1. A monitoring apparatus for monitoring an operating condition of an injection molding machine adapted to mold a disc substrate by injection molding, said injection molding machine including a mold device having a stationary and a movable mold half which cooperate to define a mold cavity to be filled with a material to mold said disc substrate, and a sprue gate through which said material is injected into said mold cavity, said injection molding machine further including an injecting screw for injecting said material into said mold cavity through said sprue gate, said monitoring apparatus comprising a display device for displaying operation data relating to an operation of said machine, said monitoring apparatus further comprising:

first display control means operable on the basis of output signals of sensors provided on said injection molding machine, for controlling said display device to simultaneously or selectively display, as said operation data, waveforms of a plurality of operating parameters including at least four operating parameters selected from a group consisting of a speed of injection of said material into said mold cavity, a pressure of injection of said material into said mold cavity, a clamping pressure of said mold device, an amount of backward movement of said movable mold half, and a position of said injecting screw, said waveforms representing chronological changes of values of said plurality of operating parameters, respectively; and second display control means for controlling said display device to indicate a first point of time at which said sprue gate is closed, such that said first point of time is indicated together with said waveforms of said plurality of operating parameters displayed under the control of said first display control means.

2. A monitoring apparatus according to claim 1, further comprising a third display control means for controlling said display device to indicate a second point of time at which said pressure of injection of said material into said mold cavity is reduced from an initial level to a hold level lower than said initial level, such that said second point of time is indicated together with said first point of time.

3. A monitoring apparatus according to claim 1, wherein said first display control means and said second display control means control said display device to display said waveforms of said plurality of operating parameters and indicate said first point of time, respectively, during an injection molding cycle performed by said injection molding machine to mold said disc substrate.

4. A monitoring apparatus according to claim 2, wherein said first display control means, said second display control means and said third display control means control said display device to display said waveforms of said plurality of operating parameters, and indicate said first and second points of time, respectively, during an injection molding cycle performed by said injection molding machine to mold said disc substrate.

5. A monitoring apparatus according to claim 1, wherein said plurality of operating parameters consist of said at least four operating parameters selected from said group.

6. A monitoring apparatus according to claim 5, wherein said first display control means controls said display device to simultaneously display said at least four operating parameters.

7. A monitoring apparatus according to claim 5, wherein said at least four operating parameters consist of said speed of injection of said material into said mold cavity, said pressure of injection of said material into said mold cavity, said clamping pressure of said mold device and said amount of backward movement of said movable mold half.

8. A control apparatus for controlling an operation of an injection molding machine adapted to mold a disc substrate by injection molding, said injection molding machine including a mold device having a stationay and a movable mold half which cooperate to define a mold cavity to be filed with a material to mold said disc substate, and a sprue gate through which the material is injected into said mold cavity said injection noding machine further including an injecting screw for injecting said material into said mold cavity through said sprue gate, said control apparatus comprising:

a monitoring apparatus for monitoring an operating condition of said injection molding maching, said monitoring apparatus comprising:

a display device for displaying operation data relating to the operation of said injection molding machine;

first display control means operable on the basis of output signals of sensors provided on said injection molding machine, for controlling said display device to simultaneously or selectively display, as said operation data, waveforms of a plurality of operating parameters including at least four operating parameters selected from a group consisting of a speed of injection of said material into said mold cavity, a pressure of injection of said material into said mold cavity, a clamping pessure of said mold device, an amount of backward movement of said movable mold half, and a position of said injecting screw, said waveforms representing chronological changes of values of said plurality of operating parameters, resnectively; and second display control means for controlling said display device to indicate a first point of time at which said sprue gate is closed, such that said first point of time is indicated together with said waveforms of said plurality of operating parameters displayed under the control of said first display control means; and a sprue-gate-closing data input device for setting said first point of time as a time period from a second point of time at which said pressure of injection of said material into said mold cavity is reduced from an initial level to a hold level lower than said initial level.

9. A control apparatus according to claim 8, further comprising a pressure-rise initiation data input device for setting a third point of time at which a rise of said clamping pressure of said mold device is initiated, as a time period from a fourth point of time at which the injection of said material into said mold cavity is initiated.

10. A method of controlling an operation of an injection molding machine by using the monitoring apparatus defined in claim 1, wherein said injection molding machine is adapted to mold a disc substrate by injection molding, and wherein said injection molding machine includes a mold device having a stationary and a movable mold half which cooperate to define a mold cavity to be filled with a material to mold said disc substrate, a sprue gate through which the material is injected into said mold cavity, and an injecting screw for injecting said material into said mold cavity through said sprue gate, said method comprising the steps of:

determining said first point of time as a time period from a second point of time at which said pressure of injection of said material into said mold cavity is reduced from an initial level to a hold level lower than said initial level; and closing said sprue gate at the determined first point of time.

11. A method according to claim 10, wherein said second point of time is determined as a time period from a moment at which said injection screw has been advanced to a predetermined position.

12. A method according to claim 10, further comprising steps of:

determining a third point of time at which a rise of said clamping pressure of said mold device is initiated, as a time period from a fourth point of time at which the injection of said material into said mold cavity is initiated; and initiating the rise of said clamping pressure of said mold device at the determined third point of time.

13. A method of monitoring an operation of an injection molding machine by using the monitoring apparatus defined in claim 1, wherein said injection molding machine is adapted to mold a disc substrate by injection molding, and wherein said injection molding machine includes a mold device having a stationary and a movable mold half which cooperate to define a mold cavity to be filled with a material to mold said disc substrate, a sprue gate through which the material is injected into said mold cavity, and an injecting screw for injecting said material into said mold cavity through said sprue gate, said method comprising the steps of:

detecting said plurality of operating parameters of said injection molding machine on the basis of output signals of sensors provided on said machine;

detecting said first point of time at which said sprue gate is closed;

simultaneously or selectively displaying said waveforms of said plurality of operating parameters detected, on said display device; and controlling said display device to indicate said first point of time, such that said point of time is indicated together with said waveforms of said plurality of operating parameters displayed on said display device.

* * * * *